United States Patent
Cameron et al.

US 6,576,297 B1

(10) Patent No.: US 6,576,297 B1
(45) Date of Patent: Jun. 10, 2003

(54) CURABLE RESIN COMPOSITIONS

(75) Inventors: Colin Cameron, Northumberland (GB); Anna Thomas, Chidlow (AU); Alastair Robert Marrion, Northumberland (GB); Ian David Fletcher, Newcastle-Upon-Tyne (GB); Stefan Norbert Rudiger Niedoba, Durham (GB)

(73) Assignee: International Coatings Ltd., London (GB)

( * ) Notice: Subject to any disclaimer, the term of this patent is extended or adjusted under 35 U.S.C. 154(b) by 18 days.

(21) Appl. No.: 09/590,847

(22) Filed: Jun. 9, 2000

Related U.S. Application Data

(63) Continuation of application No. PCT/GB98/03639, filed on Dec. 7, 1998.

(51) Int. Cl.[7] .................................................. B05D 7/24
(52) U.S. Cl. .................. 427/372.2; 528/87; 528/88; 528/118; 528/122; 528/408; 528/117; 544/358; 546/184; 548/400
(58) Field of Search .............................. 528/87, 88, 117, 528/118, 122, 408; 544/358; 546/184; 548/400; 427/372.2

(56) References Cited

U.S. PATENT DOCUMENTS

| | | | |
|---|---|---|---|
| 4,082,708 A | 4/1978 | Mehta | 260/18 N |
| 4,206,097 A | 6/1980 | Drawert et al. | 260/18 EP |
| 4,574,145 A * | 3/1986 | Cummings | |
| 4,581,454 A | 4/1986 | Myers et al. | 544/357 |
| 4,661,539 A | 4/1987 | Goel | 523/400 |
| 4,818,801 A * | 4/1989 | Rice et al. | |
| 5,021,482 A | 6/1991 | Wozniak | 524/100 |
| 5,576,416 A | 11/1996 | Walker | 528/340 |
| 5,962,629 A | 10/1999 | Corley et al. | 528/341 |
| 6,008,313 A | 12/1999 | Walker et al. | 528/123 |

FOREIGN PATENT DOCUMENTS

| | | | |
|---|---|---|---|
| CA | 2080422 | 4/1993 | C08G/59/10 |
| EP | 0 834 523 | 4/1998 | C08G/59/58 |
| GB | 2 137 637 | 10/1984 | C08F/8/00 |

OTHER PUBLICATIONS

*International Search Report PCT/GB 98/03639*, May 4, 1999.

* cited by examiner

*Primary Examiner*—Robert Dawson
*Assistant Examiner*—Kuo-Liang Peng
(74) *Attorney, Agent, or Firm*—Joan M. McGillycuddy

(57) ABSTRACT

A coating, sealant or adhesive composition curable at ambient temperatures of 40° C. or below comprises an epoxy resin and an amine-functional curing agent. The curing agent comprises a material containing at least two, and preferably at least three, heterocyclic secondary amine group.

22 Claims, No Drawings

CURABLE RESIN COMPOSITIONS

This is a continuation of International Application No. PCT/GB98/03639, with an international filing date of Dec. 7, 1998, designating the United States of America, expressly abandoned after the filing and acceptance of the present application. This application claims priority of Great Britain Patent Application No. 9726076.4, filed Dec. 9, 1997.

FIELD OF THE INVENTION

This invention relates to ambient temperature curable compositions, comprising an epoxy resin and an amine-functional curing agent and useful as coatings, adhesives or sealants, and to a process for curing the compositions.

BACKGROUND OF THE INVENTION

The use of heterocyclic secondary amines such as piperidine, pyrrolidine, aminoethylpiperazine or anabasine as curing agents is discussed in the textbook "Handbook of Epoxy Resins" by Lee and Neville published by McGraw-Hill, 1967. They are generally used in small amounts to promote mainly self-condensation of epoxide groups. Piperidine, for example, is customarily used at 5–7% by weight based on an epoxy resin such as the diglycidyl ether of bisphenol A (DGEBA). 2,3-Bipiperidine is described by Forostyan et al. in Plasticheskie Massy, 1965(1), 16–17 as providing cures with DGEBA in 2 hours at 80° C.

US-A-4581454 describes adducts of aminohydrocarbyl piperazines and urea which are used as curing agents for epoxy resins, particularly in reaction injection moulding.

SUMMARY OF THE INVENTION

According to one aspect of the present invention, a process for forming a layer of cured epoxy resin on a substrate comprises coating the substrate with a composition comprising an epoxy resin and an amine-functional curing agent and allowing the coating thus applied to cure at ambient temperature, and it is characterised in that the curing agent comprises a material containing at least two heterocyclic secondary amine groups. By a heterocyclic secondary amine group we mean a secondary amine group in which the amine nitrogen atom forms part of a heterocyclic ring.

The invention also provides for the use of a compound containing at least two heterocyclic secondary amine groups as curing agent for an epoxy resin, characterised in that the epoxy resin and the compound containing at least two heterocyclic secondary amine groups are applied together as a coating to a substrate and allowed to cure on the substrate at ambient temperature.

DETAILED DESCRIPTION OF THE INVENTION

The ambient temperature at which the coating is cured is generally below 40° C. and frequently below 25° C., and it may be below 10° C. or even below 0° C., down to –20° C. for example. At these low temperatures the epoxy resin compositions of the invention cure more rapidly than known epoxy resin compositions such as those using a diprimary amine as curing agent. We believe that initial curing of the epoxy resin is essentially through epoxide/amine reaction rather than self-condensation of epoxide groups.

The epoxy resin of the composition can in general be any of the epoxy resins described in the above textbook by Lee and Neville, preferably a glycidyl-type epoxy resin containing glycidyl ether or ester groups. The epoxy resin can for example be a glycidyl ether of a bisphenol such as DGEBA or can be a condensed or extended glycidyl ether of a bisphenol. Such glycidyl ethers derived from a bisphenol generally have an epoxy functionality of 2 or slightly less, for example 1.5 to 2. The epoxy resin can alternatively be a glycidyl ether of a polyhydric phenol, for example an epoxy novolak resin, or an aliphatic or cycloaliphatic di- or polyglycidyl ether. Examples of epoxy resins containing glycidyl ester groups are homopolymers or copolymers of a glycidyl ester of an ethylenically unsaturated carboxylic acid such as glycidyl methacrylate or glycidyl acrylate, or the diglycidyl ester of dimerised fatty acid.

In most cases the curing agent preferably contains more than two, for example at least three, heterocyclic secondary amine groups, although mixtures of a curing agent with at least three such groups and a curing agent with at least two but less than three such groups can be used. It is strongly preferred that either the epoxy resin contains an average of more than two epoxy groups per molecule or the curing agent contains an average of more than two heterocyclic secondary amine groups per molecule, for example at least 2.5 or 3 heterocyclic secondary amine groups per molecule. The heterocyclic secondary amine groups can for example be part of a heterocycle containing 3 to 12 atoms in the ring, for example a saturated heterocycle such as a piperidine, piperazine, pyrrolidine, azetidine, aziridine, imidazolidine, oxazolidine, thiazolidine or homopiperazine (1,4-diazacycloheptane) ring, an unsaturated heterocycle such as an imidazoline ring or even an aromatic ring having a secondary amine group such as pyrrole or imidazole. For rings containing two hetero-N-atoms such as piperazine or imidazolidine, it is usually preferred that only one N atom in an individual ring is present as a secondary amine group; the ring can be attached to the remainder of the curing agent molecule through the other N atom, for example the other N atom of a piperazine ring.

Thus, according to another aspect of the invention a coating, sealant or adhesive composition curable at ambient temperatures of 40° C. or below comprises an epoxy resin and an amine-functional curing agent and is characterised in that the curing agent comprises a material containing at least three heterocyclic secondary amine groups.

The curing agent can for example be the reaction product of a primary amino-substituted heterocyclic secondary amine with a compound containing two or more, preferably at least three, groups which are reactive with primary amine groups but substantially unreactive with heterocyclic secondary amine groups. The primary amino-substituted heterocyclic secondary amine can for example be N-(2-aminoethyl)piperazine, 2-(2-aminoethyl)imidazoline, N-(3-aminopropyl)piperazine, 4-(aminomethyl)piperidine, 2-(aminomethyl)piperidine, 3-(aminomethyl)piperidine or 3-aminopyrrolidine, or a substituted derivative of any of the above containing for example one or more alkyl or alkoxy substituents. The groups which are reactive with primary amine groups but not with heterocyclic secondary amine groups can for example be beta-dicarbonyl groups such as acetoacetate groups and similar beta-ketoester groups or beta-diketone groups, other aldehyde or ketone groups, for example the aldehyde groups of glutaraldehyde, terminal urea groups —$NHCONH_2$ or imide- forming groups such as cyclic anhydrides or half-esters of vic-dicarboxylic acid groups capable of forming cyclic imides. Acid groups, particularly carboxylic acid groups, and their lower alkyl esters will also react preferentially with primary amine groups rather is than heterocyclic secondary amine groups.

The curing agent can alternatively be formed by reaction of a polyfunctional reagent with pyridine substituted by a reactive functional group, followed by hydrogenation of the pyridine ring to generate secondary amine groups.

A di- or poly-acetoacetate ester, for example, can be reacted with N-aminoethylpiperazine or another primary amino-substituted heterocyclic secondary amine to bond the heterocylic secondary amine to the acetoacetate ester through an imine or enamine linkage. The reaction is shown below for trimethylolpropane tris(acetoacetate).

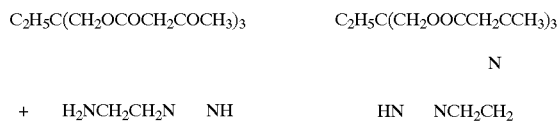

trimethylolpropane tris(2-piperazinoethyl) aminocrotonate (may exist in ketimine or enamine form)

Trimethylolpropane tris(acetoacetate) can be prepared from trimethylolpropane and a lower alkyl acetoacetate such as t-butyl acetoacetate by heating to transesterify, with removal of the volatile alcohol such as t-butanol by distillation. Poly(acetoacetate)esters can similarly be formed from other polyols such as pentaerythritol, 1,6-hexanediol, trimethylolethane or sorbitol or hydroxy-functional polymers such as acrylic polymers having pendant hydroxyl groups, for example homo- and co-polymers of 2-hydroxyethyl acrylate or methacrylate and polyesters, including hyperbranched or dendritic polymers having surface hydroxyl groups and 2,4,6-tris(hydroxymethyl)phenol and other compounds and oligomers formed by novolak condensation of an optionally substituted phenol and formaldehyde.

Glutaraldehyde will react with a primary amine to form one imine linkage followed by aldol condensation of the other aldehyde group to form a hydroxy-substituted polymer chain, provided that the reaction is carried out without having a significant molar excess of glutaraldehyde over amine at any stage. The hydroxy-substituted polymer chain may undergo further dehydration to form an unsaturated polymer chain. If glutaraldehyde is reacted with aminoethylpiperazine, a polymer is formed having pendant imine groups of the formula:

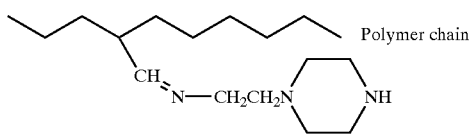

A di- or poly-urea can be reacted with N-aminoethylpiperazine or other primary amino-substituted heterocyclic secondary amine to replace the terminal —$NH_2$ of the polyurea with elimination of ammonia. The reaction is shown below for hexamethylenediurea.

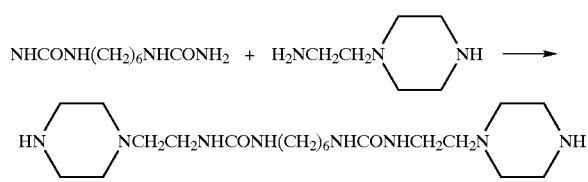

Di- and poly-ureas such as hexamethylenediurea can be prepared by heating a di- or poly-amine such as hexamethylenediamine with an excess of urea. The amino groups of the di- or poly-amine are preferably primary amino groups, although secondary amino groups will also react. The di- or poly-amine can for example be ethylene diamine, diethylene triamine or tris(2-aminoethyl)amine.

Examples of compounds and polymers containing carboxylic acid or lower alkyl ester groups which will react preferentially with primary amine groups are polyesters having terminal acid or ester groups, acrylic acid polymers or methyl or ethyl acrylate polymers, Michael-type adducts of an unsaturated carboxylic acid ester such as dimethyl maleate with a Michael donor such as a thiol or a malonate or acetoacetate ester, ester-substituted lactone reaction products of an epoxy resin with dimethyl malonate, or dimer fatty acids or acid-terminated low melting polyamides derived from them. The lower alkyl ester groups are ester groups of a lower boiling alcohol such as an alcohol having 1 to 4 carbon atoms, especially methyl or ethyl ester groups. The acid or ester groups react with primary amine groups to form amide linkages.

Although carboxylic acid groups react preferentially with primary amine groups, they will react with heterocyclic secondary amine groups under more forcing conditions, and a compound or polymer containing at least two heterocyclic secondary amine groups can be formed by reaction of a compound or polymer, for example a copolymer of acrylic acid with one or more acrylate or methacrylate ester monomers, having at least two carboxylic acid groups with piperazine. The piperazine reacts predominantly to form a monoamide of each piperazine unit.

The curing agent can alternatively be the reaction product of a hydroxy-substituted heterocyclic secondary amine such as N-(2-hydroxyethyl)piperazine with a compound or polymer containing at least two groups reactive with hydroxy groups under conditions in which the heterocyclic secondary amine does not react. For example, hydroxyethyl piperazine can be reacted with a polyisocyanate to form a urethane having at least two piperazine secondary amine groups if the amine group is first deactivated by salt formation with a strong acid. The amine groups need to be reactivated by removal of the acid before the reaction product is used as an epoxy curing agent.

When reacting a primary amino-substituted heterocyclic secondary amine such as aminoethyl piperazine with a multifunctional cyclic anhydride to form imide linkages, care should be taken to avoid gelation. The multi-functional cyclic anhydride can for example be ring-opened with an alcohol to form a half-ester, which will itself form imide linkages with aminoethyl piperazine on heating. Examples of multi-functional cyclic anhydrides are maleic anhydride polymers, for example copolymers with styrene or with an alpha-olefin such as 1-octene or with one or more acrylate or methacrylate ester monomers. Itaconic anhydride polymers can be formed from itaconic acid as described in GB-A-2137637.

The curing agent can be a polymer or oligomer containing secondary amine-containing heterocyclic rings either pendant from a polymer chain or linked in a polymer chain. Examples of heterocyclic rings pendent from a polymer chain are described above. Further examples can be derived by hydrogenation of a polymer containing pyridine groups such as poly(vinyl pyridine). Another example is a siloxane polymer containing pyridine groups which can be formed by reaction of vinyl pyridine with a polymer containing Si-H groups, for example a poly (methyl hydrogen siloxane), in the presence of a hydrosilylation catalyst such as a platinum compound. Compounds and polymers containing 3 or more pyridine groups can be formed by reaction of vinyl pyridine with a polythiol such as pentaerythritol tetra (3-mercaptopropionate). 4-Aminopyridine can be reacted with di- or poly-acid to form a di- or poly-amide containing pyridine groups or with a diacrylate to form a Michael-type adduct containing pyridine groups or with a diepoxide to form an adduct containing pyridine groups. Any of these materials can be hydrogenated to form a poly(piperidine), as can terpyridine. Analogous polymers and oligmers containing 5-membered secondary amine heterocycles can be formed from 2- or 3- vinyl pyrrole or vinyl imidazole followed by hydrogenation.

Polymers and oligomers containing pyrrolidine groups can be produced by lithium aluminium hydride reduction of maleimide or succinimide groups. An addition copolymer of maleimide (whether formed by polymerisation of maleimide or by polymerisation of maleic anhydride followed by reaction with ammonia) can be reduced to a polymer containing pyrrolidine groups linked in a polymer chain. A maleinised polymer or maleinised polyene, for example polybutadiene maleinised by reaction with maleic anhydride, or an itaconic anhydride polymer, can be reacted with ammonia to form maleimide groups which can be reduced to pyrrolidine groups. The polyene can for example be a cyclic polyene such as cyclododecatriene. A cyclic oligomer containing pyrrolidine groups can alternatively be prepared by hydrogenation of a macrocycle containing pyrrole groups, for example an acetone pyrrole reaction product.

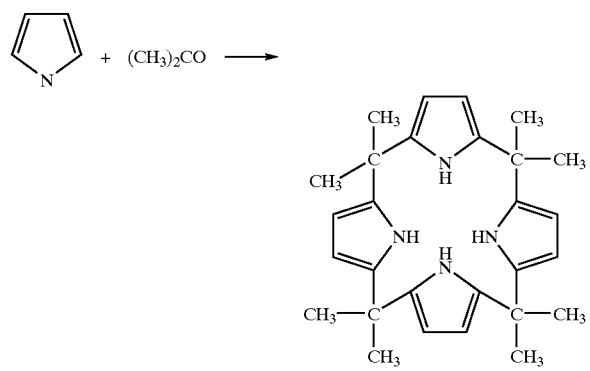

which can be hydrogenated to form a tetrapyrrolidine useful as a curing agent.

A polymer containing piperidine and/or pyrrolidine groups in the polymer chain can be produced by the free is radical initiated cyclopolymerisation of diallylamine.

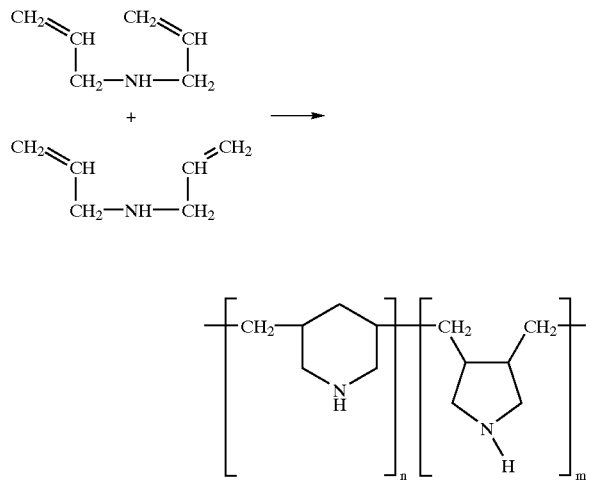

Epoxy resins cure particularly rapidly with the cyclopolydiallylamine polymerisation product. This can be valuable for a coating or sealant required to cure at particularly low temperature. The cyclopolydiallylamine can be partially reacted with a monofunctional reagent such as an epoxide or acrylate prior to the curing reaction with an epoxy resin to reduce its reactivity.

Heterocyclic amines can alternatively be formed by the reaction of ammonia with 1,2,5,6-diepoxides. The diepoxides can for example be derived from a sugar-derived polyalcohol such as D-mannitol, as described by L. Poitout et al in Tet. Lett. 35 3293 (1994). Heterocyclic secondary amines are formed as shown below:

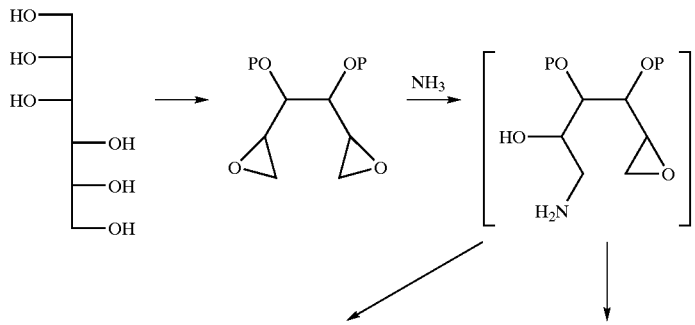

-continued

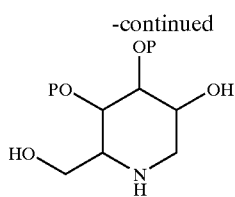
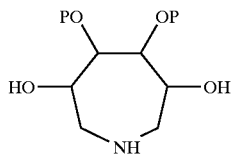

where P=protecting group.

Reaction of the diepoxide with ammonia leads to ring opening of one of the epoxides followed by spontaneous intramolecular ring closure to give the piperidine and/or the azepine. The central hydroxyl groups may be used, for example by prior reaction with isocyanate groups, to link the piperidine and/or azepine to an appropriate core unit to give multifunctionality. The diepoxide can is alternatively be derived from a polydiene, for example from 1,2- or 1,4-polybutadiene.

A curing agent containing oxazolidine groups can be prepared from a polyepoxide by reaction with ammonia followed by reaction with formaldehyde as shown below for one of the epoxide groups:

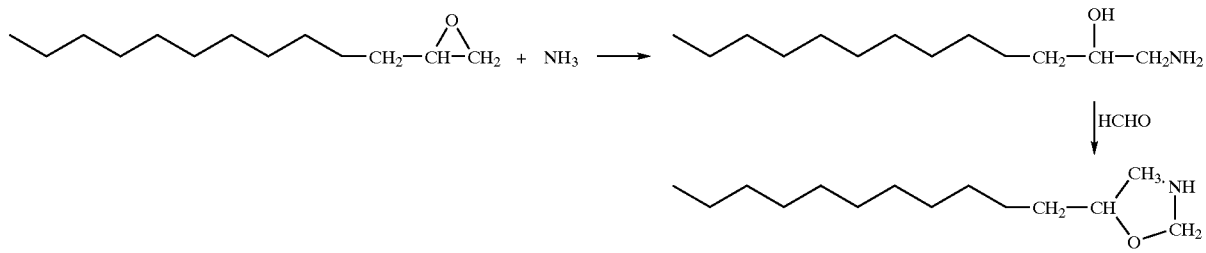

The curing agent can comprise a simple di(secondary amine heterocycle) such as 1,3-bis(4-piperidino)propane or the 1:2 molar adduct of urea and N-(2-aminoethyl) piperazine.

In general, these curing agents have the disadvantage that they are only di-functional and are often solids which are difficult to mix into curing compositions. They are preferably not used as the only amine curing agent for epoxy resins having an average epoxide functionality of 2 or less. They can advantageously be used mixed with other heterocyclic secondary amine curing agents having a functionality greater than 2, particularly liquid oligomers and polymers. The di(secondary amine heterocycle) curing agents can also be used as curing agents for epoxy resins of higher functionality such as glycidyl acrylate or methacrylate polymers or epoxy novolak resins. The di(secondary amine heterocycle) compounds can alternatively be reacted with a polymer to form a polymeric curing agent tipped with heterocyclic secondary amine groups, for example 1,3-bis(4-piperdino)propane can be reacted with a polyepoxide at a ratio of at least two piperidine groups per epoxy group to form a curing agent.

When the curing agent and epoxy resin are mixed to form a coating, sealant or adhesive composition the curing agent and epoxy resin are usually used in amounts s such that the composition contains at least 0.5 heterocyclic secondary amine groups per epoxide group, although lower amounts of amine can be used if the epoxy resin contains many epoxy groups, for example a glycidyl acrylate or methacrylate polymer. The composition preferably contains at least 0.6 up to 1.5 or 2.0 heterocyclic secondary amine groups per epoxide group, although higher amounts of the curing agent can be used if it contains many heterocyclic secondary amine groups.

The curing agent according to the invention can comprise a blend of different heterocyclic secondary amines. Normally the total curing agent present has an average of at least two heterocyclic secondary amine groups per molecule. When the epoxy resin has high functionality, for example a glycidyl acrylate or methacrylate polymer, the curing agent can be used in conjunction with a heterocyclic secondary amine having only one secondary amine group, and in these circumstances the total curing agent may have an average of less than two heterocyclic secondary amine groups per molecule.

A curing agent containing heterocyclic secondary amine groups can also be used in conjunction with another curing agent for the epoxy resin such as a primary amine. Examples of such primary amines are 1,3-bis(aminomethyl)cyclohexane, m-xylylene diamine, isophorone diamine, bis(4-aminophenyl)methane and bis(4-aminocyclohexyl)methane or even a simple primary monoamine such as n-hexylamine, n-octylamine or benzylamine. Preferably, the other curing agent does not constitute more than 50 percent of the total amine nitrogen of the curing agent.

The compositions of the invention are used as coatings, adhesives or sealants (including potting compounds used for sealing electrical and electronic components) and are particularly suitable for curing at ambient temperature, for example below 40° C. and particularly below 25° C. and including cold climates where the ambient temperature is below 10° C. or even below 0° C. down to −10° C. or −20° C. The compositions of the invention cure and harden more rapidly than epoxy resin compositions based on conventional primary amine curing agents, for example they cure 2 to 10 times faster at 10–20° C. than similar compositions based on bis(aminomethyl)cyclohexane as curing agent. The compositions of the invention can be prepared at sprayable viscosity at high solids (250 g/L or less of volatile organic material). Despite the tendency of high solids coatings to cure more slowly, coatings according to the invention can cure more rapidly than conventional amine-cured epoxy coatings of higher solvent content. The reaction rate of compositions according to the invention is about 8 times faster than that of epoxy resins cured by a hydrogenated aralkyl primary diamine, as measured by ASTM E698-79.

The compositions of the invention can for example be used as the binder of anticorrosive primer coating compositions applied to steel used in shipbuilding or structural steel used in buildings, bridges or oil rigs. Such compositions generally have to be cured at ambient temperature. The epoxy resin and the curing agent are generally stored separately and are mixed shortly before application together as a coating to the substrate, for example 10 minutes to 2 hours before application, or they can be mixed at application in a twin-feed spray and applied together. The coatings generally harden sufficiently rapidly at 10° C. (often at 0° C.) that a 200 μm coating film can be trodden on 24 hours after application, usually 8 hours after application, without gouging of the film.

The compositions may optionally contain compounds known to accelerate the epoxy-amine reaction if even faster cure is desired. Many additives tested as cure accelerators, for example Lewis acids, are described in the list compiled by Inoue in the Proceedings of the 21st Japan Congress on Materials Research, page 251 (1979) Hydrogen bond donor materials such as alcohols, phenols and acids accelerate the cure. A common example is 2,4,6-tris(dimethylaminomethyl)phenol. Metal salt catalysts such as calcium nitrate can alternatively be used.

The coatings may contain an anticorrosive pigment such as metallic zinc, zinc phosphate, wollastonite or a chromate, molybdate or phosphonate, a barrier pigment such as micaceous iron oxide, glass flake, aluminium flake or mica and/or a filler pigment such as iron oxide, barytes, talc, calcium carbonate or titanium dioxide. The coatings may also contain other coating additives such as a wetting agent, a thixotrope, a reactive diluent, for example a monoepoxide, a flow control agent, solvent or diluent. Sealant compositions generally contain a filler and/or pigment such as those listed above, and sealant or adhesive compositions may contain additives such as those listed for coating compositions. The pigments and other additives can be mixed and stored with the epoxy resin or with the curing agent or with both.

The invention is illustrated by the following Examples, in which percentages are by weight unless otherwise indicated:

EXAMPLE 1

1(a) Preparation of Curing Agent 77.4 g (0.6 mole) N-aminoethylpiperazine was added to 77.2 g (0.2 mole) trimethylolpropane tris(acetoacetate) in a Buchi flask and rotated at 80° C. for 1 hour before stripping under vacuum. 5.4 g water was removed, leaving 150 g trimethylolpropane tris(2-piperazinoethyl)-aminocrotonate as a very viscous yellow oil.

1(b) Preparation of Coating 100 parts by weight trimethylolpropane piperazinoethyl) tris(2- aminocrotonate and 80 parts by weight DGEBA-type epoxy resin of equivalent weight 185 were dissolved in 75 parts xylene/25 parts butanol (by weight) to form a coating composition having a ratio of piperazinoethyl to epoxide groups of 0.97:1. This coating, when applied at 200 μm wet thickness (130 μm dry thickness) at an ambient temperature of 23° C. on a glass plate, cured overnight to a scratch-resistant coating.

This coating composition could be pigmented with anti-corrosive pigment at a pigment volume concentration of 35% to form an ambient temperature curable primer for steel.

EXAMPLE 2

An epoxy resin paint base was prepared from the following ingredients:
Liquid DGEBA-type epoxy resin 45.25 g
Solvents (xylene benzyl alcohol, 12.19 g methoxypropanol)
Hydrocarbon resin plasticiser 3.80 g
Pigments and fillers (talc, barytes, 37.72 g yellow iron oxide)
Modified hydrogenated castor oil thixotrope 1.04 g
57.38 g trimethylolpropane tris(2-piperazino-ethyl) aminocrotonate was dissolved in 30 g xylene/10 g butanol and mixed with 4.28 g hydrocarbon resin plasticiser and then with the above paint base.

The resulting paint was applied to steel panels at 400 μm dry film thickness and allowed to dry at 0° C. The paint was touch dry after 5.5 hours, through dry after 26.5 hours and dry enough to walk on without gouging the paint film after 53 hours.

By comparison, when a paint of similar Tg and amine hydrogen to epoxide ratio was made from the same paint base with 18.75 g xylene, 6.25 g butanol and 12.23 g of the primary amine curing agent $H_2N(CH_2)_3O(CH_2)_4O(CH_2)_3 NH_2$, the 400 μm paint film was not touch dry after 6.5 hours (it became touch dry overnight) and was not through dry after 53 hours.

EXAMPLE 3

Diallylamine (110 g), water (200 g) and concentrated hydrochloric acid (140 g) were mixed cautiously and sparged with nitrogen for 2 hours. Bisazoamidinopropyl hydrochloride (2 g) was added and sparging continued for 30 minutes. A partial vacuum was applied to the flask and it was placed in an oven controlled at 60° C. and held for three days.

Potassium hydroxide (84 g) was added in portions with cooling. The water was evaporated to yield a crusty product which was digested with butanol (100 g), filtered and evaporated to yield a leathery yellow material (60 g). It was used as a 45% solution in butanol.

No residual unsaturation could be detected by NMR spectroscopy. Spectra were consistent with a predominantly 5-membered ring structure:

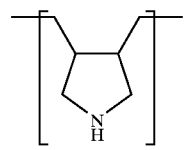

The glass transition temperature of the polymer was −53° C. (by DSC). Gel permeation chromatography of the derivatised product prepared by reacting the cyclopolymer with excess butyl acrylate gave comparative molecular weights, $M_n$=6000, $M_w$=20500 using polystyrene standards.

Mixtures of the cyclopolydiallylamine polymerisation product with epoxy resins gelled extremely rapidly. A mixture of cyclopolymer solution (2.16 g, 0.01 mole), "Epikote 828" liquid DGEBA-type epoxy resin (0.57 g; 0.003 mole) and "Cardura E10" monofunctional epoxide (1.75 g, 0.007 mole) gelled within 15 minutes. The film on glass was totally unaffected by 200 acetone double rubs after 56 hours' curing at room temperature.

EXAMPLE 4

Aminoethylpiperazine (AEP) (12.9 g, 0.1 mole) was dissolved in water (40 g) and 25% aqueous glutaraldehyde (40 g, 0.1 moles) was added dropwise. The mixture remained homogeneous until the end of the process, when the amine had been consumed and a small amount of gel separated. The gel was strained off, the water was removed by rotary evaporation, and the residue was dissolved in butanol to give a solution of NVC (non-volatile content) 46.5%. GPC of the product suggested a comparative Mn of 1500.

Epikote 828 (3.74 g, 0.02 mole), the reaction product solution (3.3 g, 0.02 mole), xylene (1.0 g) and butanol (1.0 g) were mixed. The solution became clear after about 15 minutes, and it started to gel after 20 minutes. A film cast on glass was hard and glossy and was totally unmarked by 200 acetone double rubs after 72 hour' curing at room temperature.

EXAMPLE 5

Dimethyl maleate (14.4 g, 0.1 mole), ethanedithiol (4.7 g, 0.05 mole), xylole (45 g), and "DMP 30" (2,4,6-tris (dimethylaminomethyl)phenol catalyst) were warmed together for 2 hours until there was no evidence of a C=C band in the infrared spectrum. AEP (25.8 g, 0.2 mole) was added and the mixture boiled under partial distillation conditions for 4 hours. 5.9 g of the expected 6.4 g of methanol were recovered. Rotary evaporation, yielded 42 g of an amber gum which was dissolved in butanol to give a solution of NVC 55.9%. Infrared spectroscopy showed a strong amide signal at 1651 cm$^{-1}$ and a trace of ester at 1725 cm$^{-1}$. NMR showed that the AEP was attached predominantly through its side-chain primary amine group.

EXAMPLE 6

Dimethyl maleate (7.2 g, 0.05 mole), dimethyl malonate (6.6 g, 0.05 mole) and a molar solution of sodium methoxide in methanol (0.5 g, 0.0005 mole) were held at 100° C. for 2 hours. AEP (25.8 g, 0.2 mole) and xylole (40 g) were added and the mixture was refluxed for 8 hours. Vacuum stripping yielded 39 g of an amber oil, which could be used without dilution though it hardened to a wax over several weeks. Infrared showed the presence of ester groups and the absence of unsaturation in the first stage. In the second stage there was evidence of amide (1655 cm$^{-1}$) and some imide (1696, 1772 cm$^{-1}$)

EXAMPLE 7

Epoxy Malonate Reaction Product

Sodium metal (3.45 g, 0.15 mole) was dissolved in ethanol (100 g). Dimethyl malonate (21.78 g, 0.615 mole), was added dropwise over 15 minutes. Epikote 828 (28.05 g, 0.15 equiv) dissolved in toluene (30 g) was added dropwise over 30 minutes. On completion the temperature had risen from 20° C. to 30° C. After 2 hours a viscous mass separated. Further toluene (45 g) was added and warming applied to disperse the mass. Glacial acetic acid (13.5 g, 0.225 mole) was added and the reaction product partitioned between water (200 g) and further toluene (100 g). The organic fraction was separated and washed with water (50 g). Vacuum stripping yielded 46.3 g of a clear, almost colourless, viscous oil. IR showed two equal-sized sharp bands at 1736 and 1780 cm$^{-1}$, suggesting substantial conversion of epoxy groups to lactone groups of the formula:

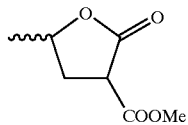

NMR was consistent with the formation of about 80% of the possible lactone.

Stage 2 Preparation of Heterocyclic Secondary Amine

Stage 1 product (14.35 g), aminoethylpiperazine (12.9 g) and xylole (25 g) were mixed and held at reflux temperature for 3 hours. The lactone signals in the infrared disappeared rapidly, followed by the ester signals. A new amide signal appeared at 1664 cm$^{-1}$, indicating that the lactone and ester groups had both been converted to amide. Vacuum stripping yielded a stiff amber liquid (28.4 g), which was dissolved in butanol to yield a 48.7% NVC solution.

EXAMPLE 8

Stage 1 product of Example 7 (14.35 g, 0.05 mole) was mixed with dimethyl maleate (7.2 g, 0.05 mole), and 1 molar sodium methoxide in methanol (0.5 g, 0.0005 mole) was added. The mixture was held at 60–68° C. for 3 hours and became very viscous. Xylene (20 g) and AEP (25.8 g, 0.2 mole) were added and heating started. Within 1 hour large amide (1656 cm$^{-1}$) and imide (1700, 1776 cm$^{-1}$) peaks were visible, and lactone and ester signals were almost completely removed. Processing was continued for a further 2 hours with little change.

The formation of imide under such mild conditions was a surprise and was possibly due to the presence of geminally substituted precursor. To the extent that imide was formed, up to 25% of the AEP was unrequited and remained free in the reaction product.

EXAMPLES 5 TO 8

Coating Compositions

The polyfunctional heterocyclic secondary amine solutions prepared in Examples 5 to 8 were mixed with Epikote 828 in a stoichiometric amount based on the nominal amine functionality to form clear coating compositions. The compositions were cast on glass and allowed to cure at ambient temperature. The gel time was noted and the solvent resistance was measured (by means of double acetone rubs resisted without marking after specified curing time at ambient temperature). The results are shown in Table 1.

TABLE 1

| Example No. | Nominal functionality of amine | Equivalent weight of amine | Weight % Solids of Composition | Gel Time | Solvent Resistance |
|---|---|---|---|---|---|
| 5 | 4 | 192.5 | 69.9% | 3 hr | 100 (24 hr) |
| 6 | 4 | 166 | 65.4 | 4 | 100 (24 hr) |
| 7 | 4 | 256.5 | 62.3 | 1.75 | 200 (72 hr) |
| 8 | 8** | 205 | 63.5 | 0.75 | 200 (16 hr) |

**Because of imide formation, functionality probably closer to 6, with some free AEP.

EXAMPLE 9

(100 g), and "Luperox 575" (tert-amyl peroxy-2-ethylhexanoate, 2.0 g) were mixed and added to refluxing oct-1-ene (60 g, 0.54 mole) over 2 hours. After 3 hours at reflux a further portion (0.2 g) of "Luperox" was added. After another hour at reflux the mixture was vacuum stripped and the viscous product dissolved in xylole to provide a solution of 42.2% NVC. The molecular weight of the polyanhydride produced was measured as Mn 2600, Mw 5780 by GPC relative to polystyrene standards.

The above solution (49.8 g, 0.1 equivalent), isopropanol (50 g) and triethylamine (0.15 g) were refluxed together for 10 hours, at which stage anhydride signals in the infrared spectrum were reduced to negligible intensity. AEP (12.9 g, 0.1 mole) was added and distillation started, with the progressive addition of xylole until a reflux temperature of 140° C. was achieved. After 12 hours at reflux, imide signals (1699, 1775 $cm^{-1}$) had become intense and amide signals (1638 $cm^{-1}$) weak. A fluid solution of 33.0% non-volatile content resulted.

EXAMPLE 10

A styrene-maleic anhydride copolymer of equivalent weight per anhydride group 224 (22.4 g, 0.1 equiv.) was dissolved in xylene (50 g), isopropanol (18 g) and triethylamine (2.0 g). After 3% hours at reflux the anhydride peak had become negligible. Aminoethyl-piperazine (12.9 g, 0.1 mole) was added, followed by a further 20 g of xylene to restore fluidity. After 10½ hours of distillation and removal of volatile solvents, a solid product was recovered by filtration and dissolved in butanol to give a solution of 27.5% non-volatile content, showing strong imide signals (1697, 1768 $cm^{-1}$)

EXAMPLE 11

A mixture of vinyl neodecanoate ("Veova 10", Shell, 66.9 g, 0.338 equiv.), xylene (30 g) and tertiary-butyl peroxide (2.0 g) was run into refluxing xylene (70 g) and maleic anhydride (33.1 g, 0.338 mole) over 2 hours. After 3 hours, tert-butyl peroxide (0.2 g) was added and ref lux maintained for a further hour. Vacuum stripping yielded 108 g of a golden glassy solid, showing anhydride (1786, 1863 $cm^{-1}$) and ester (1729 $cm^{-1}$) signals in the infrared and having Mn 750, Mw 790.

This polyanhydride (16.0 g, 0.05 equiv.), isopropanol (12 g, 0.2 mole) xylene (20 g) and triethylamine (0.15 g) were mixed, and reflux was started. The reaction mixture took on an intense purple coloration. After 6 hours at reflux the anhydride signals were negligible and ester and acid bands were predominant at 1730, 1704 $cm^{-1}$ respectively. Aminoethylpiperazine (6.45 g, 0.05 mole) was added and distillation started. After 13 hours at 140° C., infrared spectroscopy showed a strong signal at 1700 $cm^{-1}$. Vacuum stripping yielded a black liquid which was dissolved in butanol to yield a solution of 45.8% NVC.

EXAMPLE 12

A mixture of vinyl neodecanoate (63.9 g, 0.323 equiv.), xylene (30.0 g) and tert-butyl peroxide (2.0 g) was run into refluxing xylene (70.0 g) and itaconic acid (41.9 g, 0.322 mole) over 2 hours. After 3 hours a further 0.2 g tert-butyl peroxide was added, followed by two further portions at hourly intervals. Reflux was continued for a further 13 hours when a fluid homogeneous product resulted. Vacuum stripping yielded 103 g of a clear golden viscous liquid. Its infrared spectrum showed strong ester (1724 $cm^{-1}$) and anhydride (1784, 1861 $cm^{-1}$) signals. Molecular weight was measured as Mw 1630 by GPC relative to polystyrene standards. The liquid was re-dissolved in xylene to yield a solution of 58.0% non-volatile content.

The polyanhydride solution, (53.45 g, 0.1 equiv.) was refluxed with butanol (29.6 g, 0.4 mole), and triethylamine (0.15 g). After 2 hours, infrared a:spectroscopy showed complete removal of the anhydride bands. Aminoethylpiperazine (12.9 g, 0.1 mole) was added and reflux continued. Within 30 minutes a strong imide band appeared at 1702 $cm^{-1}$ and the ester band reduced in intensity. Reflux was continued for 2 hours in butanol to provide a pale amber solution of 55.9% non-volatile content.

EXAMPLES 9 TO 12

Coating Compositions

Coating compositions were prepared from the polyfunctional heterocyclic secondary amine solutions of Examples 9 to 12, cast on glass and tested for solvent resistance as described for Examples 5 to 8. The results are shown in Table 2.

TABLE 2

| Example No. | Equivalent weight of amine | Weight % solids of composition | Gel Time | Solvent Resistance* |
|---|---|---|---|---|
| 9 | 338 | 43.5 | 6 hrs | 200 after 72 hrs |
| 10 | 335 | 37.3 | 0.7 hr | 200 after 16 hrs |
| 11 | 431 | 54.9 | 8 hrs | 80 after 72 hrs |
| 12 | 421 | 64.8 | 7 hrs | 100 after 72 hrs |

**Solvent resistance determined as the number of acetone double rubs required to produce slight marring after curing at ambient temperature for the specified time.

EXAMPLES 13 TO 18

Paints

An epoxy resin paint base was prepared from the following ingredients:

|  | Weight % |
|---|---|
| Liquid diglycidyl ether of bisphenol A epoxy resin | 29.84 |
| Solvent (3:1 butanol:xylene) | 9.08 |
| Pigments and filler (talc, barytes, yellow oxide) | 60.40 |
| Thixotrope | 0.68 |

The following polyfunctional heterocyclic secondary amine solutions were then mixed with the above paint base on a 1:1 stoichiometric ratio to form a paint.

| Example No. | Polyfunctional Amine of Example No. | Weight % of solids in amine solution |
|---|---|---|
| 13 | 5 | 56.9 |
| 14 | 3 | 44.9 |
| 15 | 4 | 46.5 |
| 16 | 7 | 48.7 |
| 17 | 9 | 27.5 |
| 18 | 8 | 47.5 |

Some of each paint was drawn down onto degreased steel panels, using 300 μm and 600 μm drawdown bars, and was placed in a refrigerated cabinet at 5° C. Walk-on time was assessed for each coating, being determined as the time at which the coating can be walked on without gouging of the coating occurring. The average dry film thickness (DFT) of the cured coating was also measured. The results are shown in Table 3 below:

TABLE 3

| Example No. | DFT in μm | Walk-on Time/hrs |
|---|---|---|
| 13 | 182 | 8.25 |
| 13 | 284 | 8.25 |
| 14 | 132 | 3.16 |
| 14 | 261 | 3.16 |
| 15 | 112 | 4.08 |
| 15 | 236 | 4.08 |
| 16 | 117 | 7.58 |
| 16 | 215 | 7.58 |
| 17 | 114 | 7.33 |
| 17 | 156 | 7.33 |
| 18 | 126 | 4.58 |
| 18 | 238 | 5.33 |

A standard paint base, containing both liquid and solid diglycidyl ether of bisphenol a epoxy resins, when mixed with a standard curing agent, containing primary and secondary amine functionality, gave the following walk-on times when cured at 5° C.

120 μm DFT=8 hours
260 μm DFT=16 hours.

What is claimed is:

1. An ambient temperature curable coating composition comprising an epoxy resin and an amine functional curing agent, characterised in that the curing agent comprises a material containing an average of more than two heterocyclic secondary amine groups per molecule.

2. A coating composition according to claim 1, characterised in that the curing agent and epoxy resin are used in amounts such that the composition contains at least 0.5 heterocyclic secondary amine group per epoxide group.

3. A coating composition according to claim 2, characterised in that the composition contains 0.6 to 2.0 heterocyclic secondary amine groups per epoxide group.

4. A coating composition according to claim 1, wherein the heterocyclic secondary amine groups comprise piperidine groups.

5. A coating composition according to claim 1, wherein the heterocyclic secondary amine groups are piperazine groups attached to the remainder of the curing agent molecule through one of the nitrogen atoms of the piperazine ring.

6. A coating composition according to claim 1, wherein the heterocyclic secondary amine groups comprise pyrrolidine groups.

7. A coating composition according to claim 1, wherein the curing agent is the reaction product of a primary amino-substituted heterocyclic secondary amine with a compound containing more than two groups which are reactive with the primary amine groups but substantially unreactive with heterocyclic secondary amine groups.

8. A coating composition according to claim 7, wherein the said compound reactive with primary amine groups is a compound containing more than two beta-dicarbonyl groups.

9. A coating composition according to claim 7, wherein the said compound reactive with primary amine groups is a compound containing more than two carboxylic acid or lower alkyl ester groups.

10. A coating composition according to claim 7, wherein in that the said compound reactive with primary amine groups is a compound containing more than two cyclic anhydride groups or half-esters of vic-dicarboxylic acid groups capable of forming cyclic imides.

11. A coating composition according to claim 7, wherein the primary amino-substituted heterocyclic secondary amine is N-(2-aminoethyl) piperazine.

12. A coating composition according to claim 1, wherein the curing agent is a polymer or oligomer containing the secondary amine-containing heterocyclic rings pendant from the polymer chain.

13. A coating composition according to claim 12, wherein the polymer or oligomer is a condensation product of gutaraldehyde and a primary amino-substituted heterocyclic amine.

14. A coating composition according to claim 1, wherein the curing agent is a polymer or oligomer containing secondary amine containing heterocyclic rings linked in a polymer chain.

15. A coating composition according to claim 14, wherein the polymer or oligomer is a free radical polymerization product of diallylamine.

16. A coating composition according to claim 1, wherein the composition also contains a curing agent having less than three heterocyclic secondary amine groups.

17. A coating composition according to claim 1, wherein the composition also contains a primary amine functional curing agent.

18. A coating composition according to claim 1, wherein the composition additionally contains a Lewis acid or hydrogen bond donor as catalyst.

19. A method of applying the coating composition according to claim 1, wherein the epoxy resin and the compound containing the heterocyclic secondary amine groups are applied together to a substrate and allowed to cure on the substrate at ambient temperature.

20. A composition according to claim 6, wherein the composition also contains a primary amine functional curing agent.

21. A composition according to claim 6, wherein the total curing agent present has an average of at least two heterocyclic secondary amine groups per molecule.

22. A composition according to claim 6, wherein the composition additionally contains a Lewis acid or hydrogen bond donor as a catalyst.

* * * * *